US00RE35708E

United States Patent [19]

Malloy

[11] E Patent Number: Re. 35,708

[45] Reissued Date of Patent: Jan. 6, 1998

[54] LEVERED FOOTWEAR

[76] Inventor: John F. Malloy, 13315 Pawnee Trail Ct., Elbert, Colo. 80106

[21] Appl. No.: 503,876

[22] Filed: Jul. 18, 1995

Related U.S. Patent Documents

Reissue of:

[64] Patent No.: 5,274,932
Issued: Jan. 4, 1994
Appl. No.: 802,626
Filed: Dec. 5, 1991

[51] Int. Cl.[6] ..... A43B 5/00; A43B 5/08

[52] U.S. Cl. ..... 36/114; 36/7.5; 36/8.1; 36/116

[58] Field of Search ..... 36/1, 115, 116, 36/114, 8.1, 7.5, 7.6, 7.3, 7.4, 88, 89, 92, 105, 127, 25 R, 69, 140, 142, 143, 144

[56] References Cited

U.S. PATENT DOCUMENTS

| | | | |
|---|---|---|---|
| 2,073,570 | 3/1937 | Sutherland | 36/8.1 |
| 3,747,236 | 7/1973 | Sidlavskas | 36/114 |
| 4,030,213 | 6/1977 | Daswick | 36/114 |
| 4,098,097 | 7/1978 | Langanke et al. | 66/195 |
| 4,238,894 | 12/1980 | Evans | 36/140 |
| 4,322,894 | 4/1982 | Dykes | 36/114 |
| 4,438,574 | 3/1984 | Johnson | 36/45 |
| 4,541,186 | 9/1985 | Mulvihill | 36/114 |
| 4,550,511 | 11/1985 | Gamm | 36/91 |
| 4,649,656 | 3/1987 | Cox et al. | 36/114 |
| 4,748,753 | 6/1988 | Ju | 36/127 |
| 4,775,345 | 10/1988 | Gifford | 36/114 |
| 5,029,457 | 7/1991 | Gajjar | 66/195 |
| 5,078,633 | 1/1992 | Tolbert, Jr. | 36/114 |

FOREIGN PATENT DOCUMENTS

| | | | |
|---|---|---|---|
| 2706645 | 8/1978 | Germany | 36/114 |
| 44215 | 7/1908 | Switzerland . | |

*Primary Examiner*—M. D. Patterson
*Attorney, Agent, or Firm*—Nixon & Vanderhye P.C.

[57] ABSTRACT

A levered footwear to provide a manipulating force to an aquatic board is described. The footwear has a rigid structure extending to the rear of the heel of the wearer, which is attached to a flexible member covering a portion of the wearer's foot. An adjustable strapping holds the flexible member in place on the wearer's foot.

20 Claims, 2 Drawing Sheets

LEVERED FOOTWEAR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to footwear, specifically footwear that enhances the ability to manipulate force to and from the body in respect to the body's center of gravity as an aquatic board maneuvering enhancer.

2. Description of Prior Art

The maneuvering of an aquatic board utilizes the weight transfer of the body to the turning mechanisms. The turning mechanisms being the fins, the bottom surface, and the rails, are all controlled by the pressure from the weight transfer. Weight applied to one side will turn the board the direction of that side. The feet are the leverage devices that adjust the force from the body to the aquatic board. The foot's contribution to the weight manipulating is relative to the pressure applied to the board surface by the forward part of the foot and the heel. Increased forward foot pressure causes the bodyweight to shift backward, and decreased forward foot pressure causes the bodyweight to shift forward. This being the case, a loss of forward weight manipulating ability occurs when the body's center of gravity resides over or to the rear of the heel pivot point. This lends to toppling backwards, and in the application of aquatic board use, it decreases the ability to turn which may result in falling off the board.

An attempt in aquatic board use to solve the problem of less weight manipulating ability is found in U.S. Pat. No. 4,592,734 to Metiver. Metiver utilizes a foot strip to provide leverage. To accomplish this, a moment is created about the center of the board by applying an upward force on the bindings which translates through the center line pivot point to a downward force on the opposite side. Although increased heel side leverage is created by this binding device, its drawbacks attribute to its lack of use in surfing. It restricts foot placement, which is optimal for proper weight transfer. It is difficult to engage the strap during the transition between the paddling phase and the standing phase where weight manipulation is most needed. It also complicates paddling due to the paddler having to lay on the straps.

Attempts in surfing to enhance the ability of the foot to maneuver a surfboard by increased traction are U.S. Pat. No. 4,322,894 to Dykes and U.S. Pat. No. 4,285,082 to Cox. These items insure the leverage capability of the foot by preventing loss of turning force due to foot slippage. Cox utilizes hooks attached to footwear and loops attached to the surfboard ready to receive these hooks. The wearing of footwear in combination with the hooks and loops between the rider's foot and rigid surface of the board decreases sensitivity and control of the board. Also, the hooks and loops restrict the foot from sliding for better foot placement. To readjust the foot, upward pressure by one foot while downward pressure by the other foot is needed. This is time consuming and causes undesired weight transfer. Dykes utilizes footwear with suction cups on the bottom surface to attach to the board. It experiences the same drawbacks as does Cox's invention. Although both of these inventions increase traction, they do not provide any more rear heel weight manipulation force than the weight manipulation capability of the foot.

What is needed is a rear heel pressure point creating a leverage fixture that is attached to the foot that can enhance the ability to maneuver an aquatic board.

SUMMARY OF THE INVENTION

It is the primary object of the present invention to provide footwear that has a rear heel lever that can help manipulate the user's center of gravity on an aquatic board.

It is another object of the present invention to provide footwear that gives leverage which can be activated from rearward pressure from the heel and the ankle area that will enhance the maneuverability of a user of an aquatic board.

It is yet another object of the present invention to provide footwear that gives rotational pressure that can be activated while squatting by rotating the foot at the ankle that will enhance the maneuverability of the user of an aquatic board.

It is yet another object of the present invention to provide an adjustable arch fitting member on the user's foot that maintains sensitivity to the aquatic board surfaces to further enhance the maneuverability of an aquatic board.

Briefly, in accordance with the invention, there is provided a levered footwear to provide manipulating force to an aquatic board. The present footwear has a semi structure extending to the rear of the heel of the user. This rigid structure is attached to a flexible member attached to the user's foot. [The outer structure also extends rear of the user's heel to a half cone shaped structure that is used in a squatting position to provide means of applying pressure to the side and rear of the foot.] The above structures are supported and held in place by a custom fitted flexible adjustable strapping system.

Other objects will become apparent from the following description and appended claims taken in conjunction with the accompanying drawings.

The novel features which are believed to be characteristic of the invention together with further objects and advantages thereof, will be better understood from the following description in connection with the accompanying drawings in which the presently preferred embodiments of the invention are illustrated by way of example. It is to be expressly understood, however, that the drawings are for purposes of illustration and description only, and are not intended as a definition of the limits of the invention.

DETAILED DESCRIPTION OF THE PREFERRED EMBODIMENT

Figure 1:
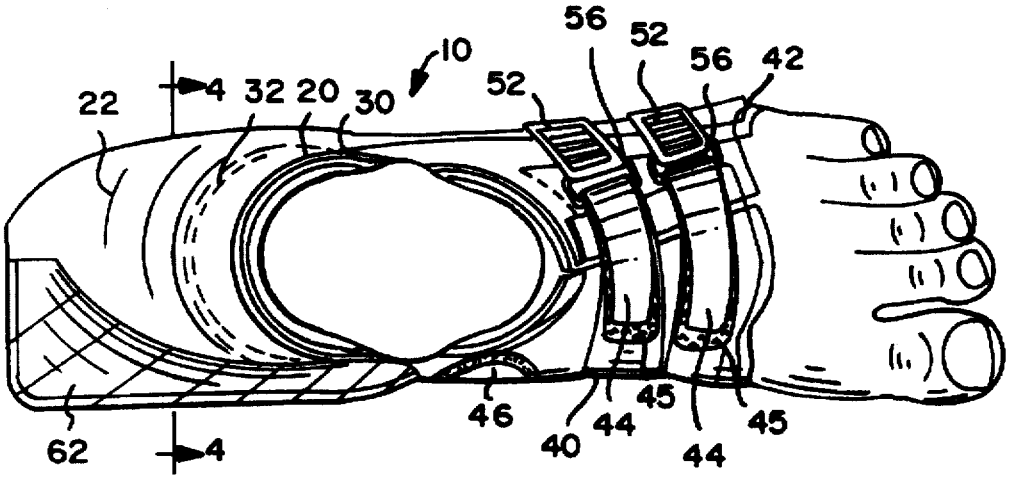
FIG. 1 is a top view of levered footwear showing strapping means and a top view of the heel roller.

Turning now to FIG. 1 there is seen a levered footwear generally shown as 10 for enhancing the maneuvering of an aquatic board.

Figure 4:
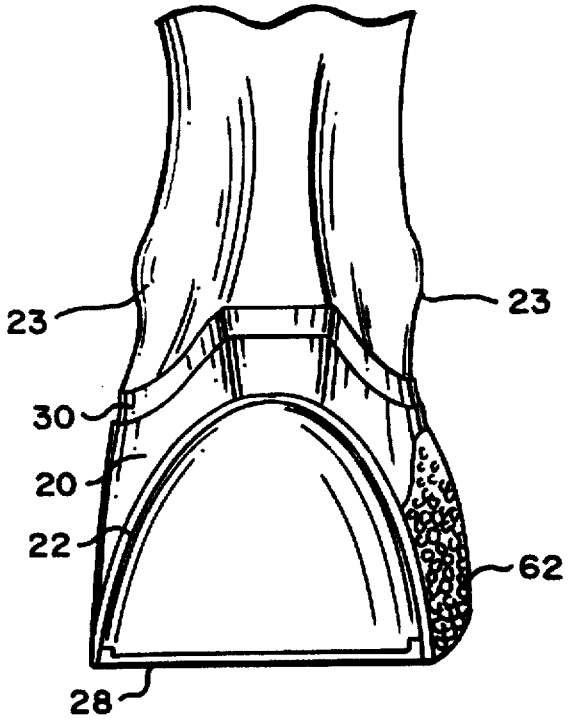
FIG. 4 is a cross section of 4—4 as seen in FIG. 1.

This levered footwear 10 surrounds the part of the foot of a user. This view also shows an outer structure 20, and inner structure 30, an extended heel structure 22, a heel cup 32 and a heel roller 62 of the levered footwear 10. The outer structure 20 is preferably made from rigid sheet plastic and is fabricated in two pieces. The first piece is flexed to form the extended heel structure 22 and the second piece is an extended heel structure foundation 28 as seen in FIG. 4. The top edge of the extended heel structure 22 at its highest point is at the bottom edge of the ankle bone 23. The bottom edge of the extended heel structure 22 at the upper board surface forms a semi-circle. The extended lever structure foundation 28 is located to the rear of the heel cup 32 inside the extended heel structure 22 and rests on the upper board surface. The edges of the extended heel structure foundation 28 are bent up creating a flange which is bonded by a suitable adhesive to the inside of the extended heel structure 22 and the outside of the heel cup 32.

The inner structure 30 is preferably made of flexible sheet plastic and includes the heel cup 32. The heel cup 32 covers the sides and rear of the user's heel and extends underneath the edge of the user's heel.

The upper and forward edge of the heel cup 32 are bonded to the inner structure 30. In addition, all areas of the inner structure 30 that comes in contact with the outer structure 20 are bonded by a suitable adhesive.

Also seen in FIG. 1 are anchor straps 52 and metallic anchor "D" rings 56. The anchor straps 52 are made of flexible non-stretching fabric and are threaded through the rings 56 and back onto themselves. The anchor straps ends 52 are fastened through the outer structure 20, flexible sole 40 and inner structure 30 preferably by stitching.

Figure 2:
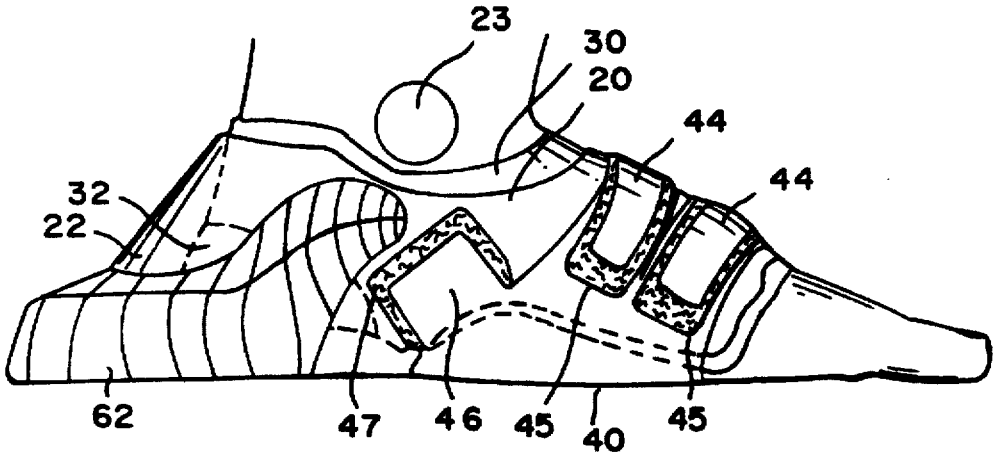
FIG. 2 is an inside view of the levered footwear showing a side view of the heel roller and strapping means for the sole member.

FIG. 1 also shows straps 44 which are also fastened, on the end 45, preferably by stitching. Straps 44 are then threaded through rings 56 and fastened back onto themselves by utilizing a hook and loop material fastened to strap 44. This provides means to hold the levered footwear 10 on the user's foot. An adjustable strap 46 shown primarily in FIG. 2 is used to insured that the sole 40 is a snug fit on the bottom of the user's foot. A section of loop material 47 is fastened to the outer structure 20, preferably by bonding. The inside of strap 46 contains hook material. When strap 46 is pulled up and the hook and loop material is engaged, all of the slack is removed from sole 40.

The heel roller 62 shown in FIG. 1 is an important item of this invention. Heel roller 62 is preferably made of molded rubber and has an inside surface that is contoured to the outside surface of the extended heel structure 22 such that the heel roller 62 can be bonded to the extended heel structure 22 by a suitable adhesive. The outer surface mimics the side of the balls of the foot and the heel roller 62 extends back as far as the rear most part of the extended heel structure 22 where it turns inward 90 degrees to intersect the rear of the extended heel structure 22. The operation of heel roller 62 relative to manipulating the aquatic board will be explained under the operation of the preferred embodiment.

FIG. 2 shows how the inside of the extended heel structure 22 is covered by the heel roller 62 such that the indentation between the user's heel and ankle bone 23 is filled. Also shows is the relationship between the heel cup 32 and the heel roller 62.

Figure 3:
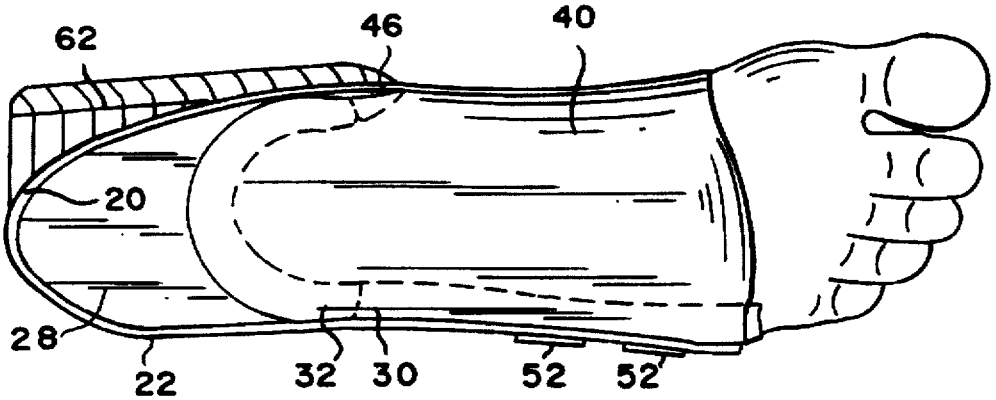
FIG. 3 is a bottom view showing the sole member and a bottom view of the heel roller.

FIG. 3 shows the bottom edge of the extended heel structure 22 attached to the outer structure 20. Also shown is sole member 40 covering a portion of the user's foot. The flexible sole is fabricated from rubberized cloth *42* which flexes but does not stretch and is bonded to the outside surface of the inner structure 30 and the inside surface of the outer structure 20 by a suitable adhesive. FIG. 3 also shows the top portion of the heel roller 62.

FIG. 4 is a cross section of FIG. 1 along the lines 4—4. FIG. 4 shows how the outer structure 20 and the inner structure 30 circle forward below the ankle bone 23. FIG. 4 also shows how the extended lever structure foundation 28 fits into the extended heel structure 22.

Figure 5:
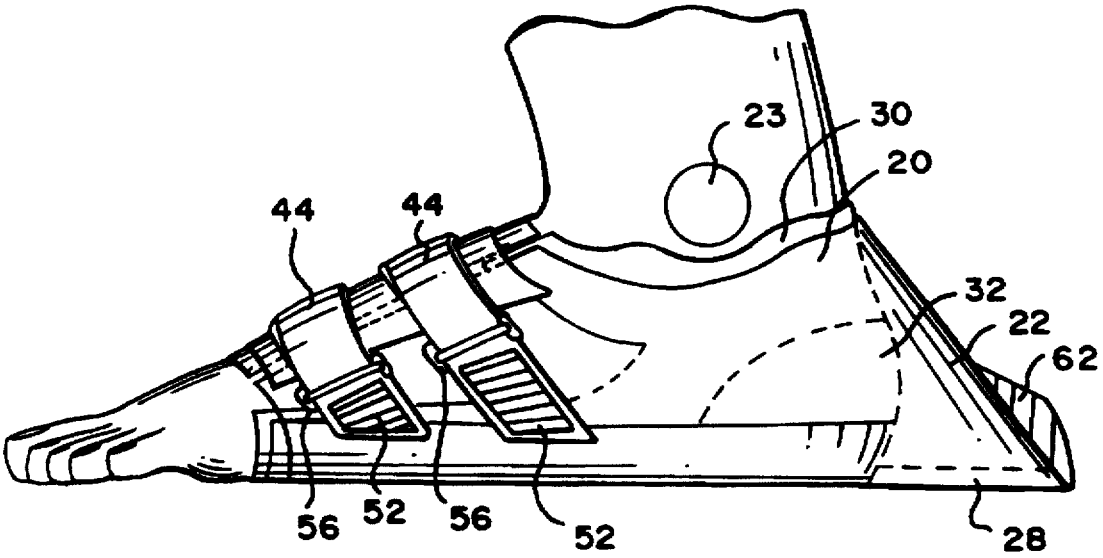
FIG. 5 is an outside view of the levered footwear showing the extended heel structure.

FIG. 5 shows an outside view of the levered footwear 10 showing inner structure 30, outer structure 20, straps 44, heel roller 62 and extended lever structure foundation 28.

The operation of the levered footwear 10 provides a means for the user's feet to manipulate an aquatic board by providing pressure to the rear of the normal heel pressure point while maintaining sensitivity of the bottom of the foot to the board surface.

The levered footwear may be worn on either the left foot with the right foot forward on the aquatic board or the right foot with the left foot forward on the aquatic board. However, the levered footwear may be worn on both feet.

Rear heel pressure in this invention is accomplished when pressure travels to the rear of the user's heel to the upper board surface. The foot manipulates the levered footwear 10 by a rearward motion of the leg which causes downward pressure to the extended heel structure 22 to the aquatic board's upper surface. The levered footwear 10 manipulates the user's foot and body center of gravity by giving upward pressure from the board's upper surface. The inner structure 30, the outer structure 20, the sole 40 and straps 44 hold the user's heel in the heel cup 32. This prevents loss of leverage due to the heel sliding away from the heel cup 32 which would nullify the leverage pivot point.

*Counter rear of the heel pressure is accomplished when pressure travels between the dorsal surface of the foot and the rear heel ground surface point. The foot manipulates the fixture by upward pressure of the dorsal surface of the foot raising the portions of the inner structure 30 and the outer structure 20 that is forward of the malleolus bones, and that pressure is then converted to downward pressure on the portion of the inner structure 30 and the outer structure 20 rear of the malleolus bone, which has the bottom edges of the rear heel lever 22 and bottom surface of lever foundation 28, which finally applies downward pressure to the ground surface. The fixture manipulates the foot and bodyweight's center of gravity by having upward pressure from the ground surface travel the opposite direction. The underlying portion of the inner structure 30 as well as the adjustable sole 40 and strap anchorage 50 prevent the portion of the inner structure 30 and the outer structure 20 that is below the malleolus bones from rising up the side of the foot. This rising would nullify the pivot axle and result in a loss of leverage. Also, they prevent the separation of the forward structures which would result in a loss of pressure.*

Rotational pressure[, the most important part of this invention] is required when the user of the levered footwear 10 is [attempting to catch a wave while surfing] *riding in a tube*. In this position the user's knee is close to the upper surface of the board and the user's center of gravity is low. Heel roller 62 is used to apply pressure between the side of the user's foot and the board's upper surface. The heel roller 62 is used to guide said aquatic board by pulling on one side of the levered footwear and pushing on the other side. The levered footwear 10 manipulates the user's foot and body center of gravity by giving upward pressure from the board's upper surface.

What is claimed is:

1. A levered footwear to provide a wearer of said levered footwear a manipulating force for maneuvering an aquatic board, having an upper and lower surface, comprising:

an inner structure surrounding a wearer's foot, said inner structure fabricated from flexible sheet plastic;

a heel cup formed from said inner structure;

an outer structure surrounding said inner structure;

an extended heel structure, said extended heel structure bring formed by extending said outer structure to the rear of said wearer's heel;

a heel structure foundation, said heel structure foundation being adjacent to the upper surface of the aquatic board, said heel structure foundation being bonded at the edge to said extended heel structure;

a sole member, said sole member being fabricated from a flexible non-stretchable rubberized cloth, said rubberized cloth being bonded on its edges between said outer structure and said inner structure by a suitable adhesive;

a heel roller member, said heel roller member fabricated from molded rubber, said heel roller being bonded to said extended heel structure on the inside of said levered footwear;

first fastening means, said first fastening means being at least one strap across the top of said levered footwear holding said outer structure on said levered footwear, said strap across the top of said levered footwear being fabricated in two parts, the first part of said strap having one end stitched to said outer structure, the other end of said first part of said strap being unattached, the second part of said strap having one end stitched to said outer structure by stitching the other end of said second part of said strap having a metallic "D" ring attached thereto, said unattached end of said first part of said strap having hook and loop material attached thereto;

second fastening means being at least one strap on the inside of said levered footwear being attached on one end by stitching to said outer structure the other end of said strap being unattached, said strap on the unattached end having hook material attached thereto, said hook material engaging loop material attached to the side of said outer structure.

2. A levered footwear as described in claim 1 wherein said first part of said first fastening means engages said second part of said first fastening means to hold said outer structure together.

3. A levered footwear to provide a wearer of said levered footwear a manipulating force for maneuvering an aquatic board, an upper and lower surface, comprising:

an inner structure surrounding a wearer's foot;

an outer structure surrounding a wearer's foot;

an extended heel structure;

a heel cap attached to said inner structure;

a heel structure foundation;

a sole member;

a heel roller member;

first fastening means to hold said levered footwear on said wearer's foot second fastening means attached to said sole member;

said extended heel structure formed from a rearward extension of said out structure and bonded to the edge of said heel structure foundation by a suitable adhesive;

said inner heel structure being fabricated from flexible sheet plastic;

said heel cup being formed by a section of said inner structure;

said sole member being fabricated from a flexible non-stretchable rubberized cloth, said rubberized cloth being bonded on its edge between said outer structure and said inner structure by a suitable adhesive.

*4. Levered human footwear having a bottom, and, comprising:*

*a structure surrounding a wearer's foot and having a front portion, a heel portion and a sole, and an instep portion;*

*said sole formed of flexible material that does not stretch and having a bottom surface that defines the bottom of the footwear; and*

*an extended heel structure distinct from said sole, extending outwardly from said heel portion to a rearwardmost portion.*

*5. Levered footwear as recited in claim 4 further comprising a heel roller extending from said instep portion adjacent said heel portion, and extending to said rearwardmost portion of said extended heel structure.*

*6. Levered footwear as recited in claim 5 wherein said sole comprises cloth.*

*7. Levered footwear as recited in claim 6 wherein said structure surrounding a wearer's foot is adjustable.*

*8. Levered footwear as recited in claim 7 wherein said structure surrounding a wearer's foot is adjustable by tightening or loosening a plurality of straps.*

*9. Levered footwear as recited in claim 8 wherein said adjustable straps have hook and loop fasteners.*

*10. Levered footwear as recited in claim 5 wherein said extended heel structure extends outwardly from said heel portion a distance sufficient to enhance maneuverability of an aquatic board by the wearer.*

*11. Levered footwear as recited in claim 5 wherein said heel roller has an outer surface which mimics the side of the balls of the wearer's foot.*

*12. Levered footwear as recited in claim 10 wherein said heel roller is shaped and dimensioned so that when used on an aquatic board the wearer guides the aquatic board by applying pressure between the side of the wearer's foot and the aquatic board's upper surface.*

*13. Levered footwear as recited in claim 4 wherein said heel portion includes a heel cup, and wherein said structure surrounding a wearer's foot tightly holds the wearer's foot in contact with said heel cup so that counter pressure is applied to said extended heel structure by the wearer lifting up on the wearer's foot forward of the malleolus bones.*

*14. Levered footwear as recited in claim 4 wherein said sole comprises rubberized cloth.*

*15. Levered footwear as recited in claim 4 wherein said structure surrounding a wearer's foot is adjustable by tightening or loosening a plurality of straps.*

*16. Levered footwear as recited in claim 4 wherein said extended heel structure extends outwardly from said heel portion a distance sufficient to enhance maneuverability of an aquatic board by the wearer.*

*17. Levered footwear as retired in claim 4 wherein said structure surrounding a wearer's foot includes an inner structure fabricated from flexible sheet plastic and an outer structure surrounding said inner structure, said extended heel structure extending outwardly from said outer structure.*

*18. Levered footwear as recited in claim 17 wherein said inner structure includes a heel cup at said heel portion; and further comprising adjustable straps facilitating holding of the wearer's heel tightly within said heel cup.*

*19. Levered human footwear for use with an aquatic board comprising:*

*a structure surrounding a wearer's foot and having a front portion, a heel portion and a sole, and an instep portion;*

*said sole formed of flexible material that does not stretch;*

*an extended heel structure extending outwardly from said heel portion a distance sufficient to enhance maneuverability of an aquatic board by the wearer to a rearwardmost portion; and*

*a heel roller extending from said instep portion adjacent said heel portion, and extending to said rearwardmost*

*portion of said extended heel structure, said heel roller having an outer surface which mimics the side of the balls of the wearer's foot.*

*20. Levered footwear as recited in claim 19 wherein said heel roller is of molded rubber.*

* * * * *